United States Patent [19]

Hall

[11] 4,366,195

[45] Dec. 28, 1982

[54] FORMATION OF POLYMERIC COATINGS

[75] Inventor: Wilbur S. Hall, Plymouth Meeting, Pa.

[73] Assignee: Amchem Products, Inc., Ambler, Pa.

[21] Appl. No.: 193,081

[22] Filed: Oct. 2, 1980

Related U.S. Application Data

[63] Continuation of Ser. No. 24,399, Mar. 27, 1979, abandoned, which is a continuation of Ser. No. 800,137, May 24, 1977, abandoned.

[51] Int. Cl.$^3$ .............................................. B05D 1/18
[52] U.S. Cl. ................... 427/435; 427/388.1; 427/388.2; 427/388.4
[58] Field of Search .................. 427/435, 388.1, 388.2, 427/388.3, 388.4

[56] References Cited

U.S. PATENT DOCUMENTS

| | | | |
|---|---|---|---|
| 3,397,077 | 8/1968 | Bollen et al. | 427/435 |
| 3,501,391 | 3/1970 | Smith et al. | 427/463 |
| 3,585,084 | 6/1971 | Steinbrecher et al. | 427/435 |
| 3,865,617 | 2/1975 | Shimizu et al. | 427/435 |
| 3,873,349 | 3/1975 | Kimura et al. | 427/36 |
| 3,914,519 | 11/1975 | Hall et al. | 427/435 |

FOREIGN PATENT DOCUMENTS

| | | |
|---|---|---|
| 237781 | 10/1959 | Australia . |
| 72/1146 | 2/1972 | South Africa . |
| 1155497 | 6/1969 | United Kingdom . |

*Primary Examiner*—Norman Morgenstern
*Assistant Examiner*—Richard Bueker
*Attorney, Agent, or Firm*—Alexis Barron

[57] ABSTRACT

An aqueous coating composition containing a monomer which is capable of polymerizing in the presence of a metallic substrate in contact with the composition to form a polymer which has a multiplicity of groups capable of ionizing to form negatively charged groups on the polymer chain. Also, an autodepositing composition having included therein a monomeric constituent, that is, a material capable of being polymerized, for forming an organic coating on a metallic substrate.

18 Claims, No Drawings

FORMATION OF POLYMERIC COATINGS

This application is a continuation of copending application Ser. No. 24,399, filed Mar. 27, 1979 now abandoned, which in turn is a continuation of application Ser. No. 800,137, filed May 24, 1977, now abandoned.

FIELD OF THE INVENTION

This invention relates to the formation of polymeric coatings on substrates. More specifically, this invention relates to the formation on a metallic surface of a polymeric coating by contacting the metallic surface with a water-based coating composition containing an organic coating-forming constituent.

REPORTED DEVELOPMENTS

Various types of compositions are known for forming organic or polymeric coatings on metallic substrates.

For example, U.S. Pat. No. 3,397,077 to Boller et al discloses a coating composition comprising an aqueous solution containing a water soluble organic resin-forming material and an inorganic oxyacid such as suphuric, sulphonic, boric, phosphoric or nitric acid. In a coating process utilizing this type of composition, a metallic surface is immersed in the composition and there is formed thereon a polymeric coating as a result of the resin-forming material polymerizing to the extent of forming a solid polymeric material which deposits on the metallic surface. The resin-forming materials disclosed in this patent are materials which polymerize to form condensation polymers such as amine resins, polyamide resins and polyester resins. The patent discloses that the inorganic oxyacid is included in the composition in amounts sufficient to effect reaction between the composition and the metallic surface.

British Pat. No. 1,155,497 discloses the application to an iron substrate of a resinous coating utilizing an acidic aqueous coating composition comprising: (A) a soluble, polymerizable substituted acrylamide; and (B) a water soluble hydroperoxide, for example, $H_2O_2$. The coating process described in this patent is similar to the process described in the aforementioned Boller et al patent in that each of the processes involves the use of an aqueous composition which contains acid and a monomeric constituent that polymerizes in the presence of a metallic substrate to form a polymeric or resinous material which deposits on the substrate. The processes described in the aforementioned patents differ in that the polymeric material formed in the Boller et al process is a condensation polymer, whereas the polymeric material formed in the process of the British patent is an addition polymer.

In contrast to the processes described in the aforementioned patents, it is known also to deposit resinous coatings on metallic substrates by immersing the substrates in water-based compositions that contain preformed resinous materials. As such, these types of processes do not rely on the polymerization of monomers in the presence of the metallic substrates, as described in the aforementioned patents.

Electrocoating is an example of a process in which a resinous coating is deposited on a metallic substrate from a water-based composition containing a preformed polymeric resinous material. As its name implies, the electrocoat process involves the use of electricity.

A relatively recent develoment in the organic coating field is the provision of water-based coating compositions which are effective, without the aid of electricity, in forming on metallic surfaces immersed therein organic coatings which increase in thickness or weight the longer the time the surfaces are immersed in the composition. (For convenience, a coating composition of this type is hereafter referred to as an "autodepositing composition" and coatings formed from such compositions are referred to as "autodeposited coatings".) Speaking generally, compositions which are so effective comprise acidic aqueous coating solutions having dispersed therein particles of an organic material such as resin particles. Autodeposited coatings are formed from such compositions as a result of their ability to attack and dissolve from the metallic surface metal ions in amounts which cause the particles to deposit on the surface in a manner such that there is a continuous build-up of an organic coating on the surface.

The present invention relates to the formation of polymeric coatings from novel water-based compositions containing organic coating-forming constituents.

SUMMARY OF THE INVENTION

In accordance with the present invention, there is provided an aqueous composition capable of being used in forming an organic or polymeric coating on a metallic substrate and containing at least one monomeric constituent.

One aspect of the present invention involves the use in the aqueous composition of a monomer which is capable of polymerizing to form a polymer which has a multiplicity of groups capable of ionizing to form negatively charged groups on the polymer chain and which deposits on a metallic substrate in contact with the composition during polymerization of the monomer. In the preferred form of this aspect of the present invention, a carboxylic acid monomer is polymerized by free radical addition polymerization in an acidic aqueous composition having immersed therein a ferriferous surface to form a polymer having a plurality of carboxyl (—COOH) groups. It is theorized that deposition on the metallic surface of the organic coating-forming material involves bonding of carboxylate (—COO$^\ominus$) groups to the ferriferous surface which has a positive charge as a result of its being oxidized by the acidic aqueous composition.

Another aspect of the present invention is the provision of an autodepositing composition having included therein a monomer which is capable of polymerizing. In preferred form, this aspect of the present invention comprises an autodepositing composition formulated from styrene-butadiene resin solids dispersed in an aqueous solution of hydrofluoric acid and ferric fluoride and having added thereto a monomer capable of forming an addition polymer.

DETAILED DESCRIPTION OF THE INVENTION

In one embodiment of the present invention, the essential ingredients of the coating composition are water, acid and at least one monomer which is capable of polymerizing to form a polymer which has a multiplicity of groups capable of ionizing to form negatively charged groups on the polymer chain. Such polymers should include negatively charged groups other than, and/or in addition to, negatively charged terminal groups on the polymer chain. The polymerization/coating process of the present invention is carried out under conditions whereby the monomer polymerizes in the water based composition in the presence of a metallic surface contacted therewith to form a polymer which deposits on the metallic surface. The polymer, which can comprise an addition or condensation polymer, can be formed according to any of the various polymerization mechanisms, for example, free radical addition polymerizations, ionic addition polymerizations, and condensation reactions. Depending on the specific mechanism, the process includes the conditions necessary to initiate the polymerization and to maintain the polymerization. Such conditions, of course, are well known.

In preferred form, the polymer is an addition polymer formed by free radical addition polymerization which is initiated at room temperature. To effect this, the coating composition contains, as an additional essential ingredient, an initiator, that is, a material which generates free radicals.

Speaking generally, any monomer capable of polymerizing in water and in the presence of the metallic surface to be coated and having a group capable of ionizing in the composition to form a negatively charged radical can be used. Such monomers can be polymerized to form polymers having the aforementioned desired groups. Examples of such groups include carboxyl (—COOH), phenolic (—OH) and sulfonic (—SO$_3$H) groups which are capable of ionizing respectively to the following: —COO$^-$, —O$^-$, —SO$_3^-$. It should be understood that the aforementioned are exemplary. Examples of monomers that can be used are the following: ethylenically unsaturated carboxylic acids, for example, acrylic, methacrylic, ethacrylic, and alpha-chloroacrylic acid.

An initiator capable of generating free radicals, preferably at room temperature and soluble in the composition, can be used to initiate the free radical addition polymerization of suitable monomers. Examples of initiators are peroxides, hydroperoxides, organic azo compounds, permanganates, perborates and persulfates. Examples of specific initiators include: hydrogen peroxide, benzoylperoxide, t-butylhydroperoxide and azo-bis-isobutyronitrile. It should be understood that the aforementioned are exemplary and that other initiators can be used.

The proportion of monomer comprising the composition can vary over a relatively wide range and will depend on various factors including, for example, the amounts of polymer which it is desired to deposit, the time of contact between the metallic surface and the composition and the rate of polymer formation. In general, the amount of monomer will comprise about 0.5 to about 50 wt. % of the composition.

Conventional amounts of initiator can be used when utilizing such materials to initiate the polymerization. The amount will depend, for example, on the particular initiator used and the monomer being polymerized. In general, the amount of initiator will comprise about 0.05 to about 10 wt. % of the composition.

The coating composition includes an acid which will oxidize or dissolve metal from the metallic surface. Any acid capable of doing this can be used. Examples of such acids include: hydrofluoric, sulphuric, phosphoric, nitric, hydrochloric, hydrobromic, hydroiodic, acetic, chloroacetic, trichloroacetic, lactic and tartaric. The amount of acid should be such that the composition dissolves metal from the surface. Depending on the metallic surface being coated and other factors, the pH will generally fall within the range of about 1.6 to about 6.

Turning now to that embodiment of the present invention which includes the addition of a polymerizable monomer to a coating composition which is effective in forming an autodeposited coating, examples of autodepositing compositions are described in U.S. Pat. Nos. 3,585,084, 3,592,699, 3,709,743 and 3,776,848, in British Pat. No. 1,241,991, in South African Pat. No. 72/1146 and in Belgian Pat. of Addition No. 811,841.

Speaking generally, the acidic aqueous coating compositions of the aforementioned type function to attack and dissolve from a metallic surface contacted therewith metal ions in an amount sufficient to directly or indirectly cause organic particles in the region of the metallic surface to deposit thereon in a continuous fashion, that is, in a manner such that there is a buildup in the amount of organic material deposited on the surface the longer the time the surface is in contact with the composition. This deposition of the organic material on the metallic surface is achieved through chemical action of the coating composition on the metallic surface. The use of electricity which is necessary for the operation of some coating methods, such as the electrocoating method, is not required.

There follows a description of exemplary autodepositing compositions.

U.S. Pat. Nos. 3,585,084 and 3,592,699 disclose aqueous compositions comprising resin solids, an acid (for example, hydrofluoric, sulfuric, hydrochloric, nitric, phosphoric, hydrobromic, hydroiodic, chloracetic, trichloracetic, lactic, tartaric and acetic) and an oxidizing agent (for example, hydrogen peroxide, dichromate, perborate, bromate, permanganate, nitrate and chlorate). The ingredients are present in amounts which are effective in dissolving metal from the metallic surface immersed therein to form in the composition ions in a sufficient amount to cause the resin particles to deposit on the metallic surface in a manner such that the resinous coating grows with time. (Exemplary compositions disclosed in said patents are effective in dissolving at least about 25 mg/sq.ft. of an iron surface within the first minute of time the surface is immersed in the composition.) For this purpose, the composition contains sufficient acid to impart a pH of less than 7 to the composition, preferably to impart a pH thereto within the range of about 1.6 to about 3.8. The oxidizing agent is present in an amount sufficient to provide an oxidizing equivalent of at least about 0.01 per liter of the composition. The preferred composition described in the aforementioned patents comprises about 5 to about 550 g/l of resin solids, hydrofluoric acid in an amount sufficient to impart to the composition a pH within the range of 1.6 to about 3.8 and equivalent to about 0.4 to about 5 g/l of fluoride, and as an oxidizing agent, dichromate or most preferably hydrogen peroxide, in an amount to provide about 0.01 to about 0.2 of oxidizing equivalent per liter of composition.

U.S. Pat. No. 3,709,743 discloses an acidic aqueous coating composition having a resin solids content of about 2 to about 65 wt. %, preferably about 5 to about 20 wt. %, and nitric acid in an amount of about 0.1 to about 5 wt. %, preferably about 0.5 to about 2 wt. %, with the preferred pH of the composition being below about 2.

South African Pat. No. 72/1146 discloses an acidic aqueous coating composition containing about 5 to about 550 g/l of resin solids, a soluble ferric-containing compound in an amount equivalent to about 0.025 to about 3.5 g/l ferric ion, and preferably about 0.3 to about 1.6 g/l of ferric ion, and acid in an amount sufficient to impart to the composition a pH within the range of about 1.6 to about 5.0. Optionally an oxidizing agent may be used in an amount to provide from about 0.01 to about 0.2 oxidizing equivalent per liter of composition. Examples of the aforementioned ferric-containing compounds are ferric fluoride, ferric nitrate, ferric chloride, ferric phosphate and ferric oxide. Examples of acids are sulfuric, hydrochloric, hydrofluoric, nitric, phosphoric, and organic acids, including, for example, acetic, chloracetic and trichloracetic. Examples of oxidizing agents are hydrogen peroxide, dichromate, permanganate, nitrate, persulfate and perborate. The preferred composition is described as being prepared from about 5 to about 550 g/l of resin solids, about 1 to about 5 g/l of ferric fluoride trihydrate, and hydrofluoric acid in an amount sufficient to impart to the composition a pH within the range of about 1.6 to about 5.0.

Belgian Pat. of Addition No. 811,841 discloses a coating composition containing about 5 to about 550 g/l of resin solids, a metal-containing compound which is soluble in the composition and acid to impart to the composition a pH within the range of about 1.6 to about 5.0. Examples of the soluble metal-containing compound are silver fluoride, ferrous oxide, cupric sulfate, cobaltous nitrate, silver acetate, ferrous phosphate, chromium fluoride, cadmium fluoride, stannous fluoride, lead dioxide, and silver nitrate. The metal compound is present in the composition in an amount within the range of about 0.025 to about 50 g/l. Examples of acids that can be employed are sulfuric, hydrochloric, hydrofluoric, nitric and phosphoric and organic acids such as acetic, chloracetic and trichoracetic. The use of hydrofluoric acid is preferred. Optionally, an oxidizing agent may be used in an amount sufficient to provide from about 0.01 to about 0.2 of oxidizing equivalent per liter of composition. Examples of oxidizing agents are hydrogen peroxide, dichromate, permanganate, nitrate, persulfate and perborate.

British Pat. No. 1,241,991 discloses an acidic aqueous coating composition containing an oxidizing agent and solid resin particles stabilized with an anionic surfactant. The composition is substantially free of nonionic surfactant. The resin particles comprise about 5 to about 60 wt. %, preferably about 10 to about 30 wt. %, of the composition. The anionic surfactant comprises about 0.5 to about 5 wt. %, preferably about 2 to about 4 wt. %, based on the weight of the resin. Examples of anionic surfactants are the alkyl, alkyl/aryl or naphthalene sulionates, for example sodium dioctyl sulphosuccinate and sodium dodecylbenzene sulfonate. The oxidining agent is described as being of the kind commonly known as a depolariser, and preferably is present in the composition in an amount of about 0.02 to about 0.2 N. Examples of oxidizing agents are hydrogen peroxide, p-benzoquinone, p-nitrophenol, persulfate and nitrate. Acids such as phosphoric, hydrochloride sulfuric, acetic, trichloracetic and nitric are used to impart to the composition a pH of preferably less than 5, most preferably less than 3.5.

A preferred autodepositing composition to which the monomer is added comprises a ferric-containing compound, most preferably ferric fluoride, in an amount such that it contains the equivalent of about 0.5 to about 3.5 g/l of ferric iron, about 0.2 to 5 g/l of HF and about 50 to about 125 g/l of resin solids and having a pH of about 1.6 to about 4.

The monomer added to the autodepositing composition can be any material which is capable of polymerizing in the composition in the presence of a metallic surface contacted therewith or which is capable of polymerizing after the composition has been deposited on a metallic surface in the form of a wet film. For example, the monomer may polymerize during a post treatment step in which the preformed resinous material which is deposited is fused at elevated temperatures. It should be understood that the monomer may polymerize substantially or partially while the metallic surface is immersed in the composition or polymerization may be effected after withdrawal from a bath of the composition.

Any monomer capable of polymerizing under conditions described above can be used, including, for example, monomers for forming addition polymers, condensation polymers and other specialized types of polymers. Mechanisms of polymerization can include, for example, free radical addition polymerization, ionic addition polymerization, condensation reactions, ring-opening reactions, as well as other types of polymerization reactions.

Examples of monomers include ethylenically unsaturated compounds such as ethylene, propylene, isobutylene, acrylic, methacrylic, and ethacrylic acids, methyl methacrylate, ethyl acrylate, ethyl methacrylate, butyl methacrylate, octadecyl methacrylate, cyclohexyl methacrylate, methoxymethyl methacrylate, acrylonitrile, betadiethylaminoethyl methacrylate, chloroethyl methacrylate, methacrylic anhydride, alpha-chloroacrylic acid, vinyl and vinylidene halides, for example, vinyl fluoride, vinyl chloride, vinylidene chloride, vinylidene fluoride, vinylidene fluorochloride, vinyl esters, for example, vinyl acetate, vinyl propionate, vinyl stearate, vinyllaurate, vinyl chloroacetate, aryl vinyl compounds, for example, styrene, para-chlorostyrene, vinyl naphthalene; and other types of vinyl derivatives such as vinyl pyridine, methyl vinyl ketone, vinyl ethyl ether and vinyl isobutyl ether.

The amount of monomer can vary other a wide range and will depend on various factors inlcuding the amount of resin that it is desired to deposit, the time of contact with the coating composition and the rate of polymerization. In general, the amount of monomer can comprise about 0.5 to about 50 wt. % of the composition.

Depending upon the particular monomer involved and the type of polymerization conducted, the composition can include initiators, including the initiators mentioned above, polymerization catalysts, chain transfer agents and/or the polymerization can be conducted under conditions whereby polymerization is initiated by heating or ultra-violet radiation.

With respect to the different embodiments of the present invention, it should be understood that more than one monomer can be used to produce a copolymer or higher polymer.

Also, the compositions of the present invention can include pigments and/or other ingredients normally added to autodepositing compositions provided that they do not interfere with the polymerization reactions.

Although it is preferred to initiate the polymerization at room temperature, elevated temperatures can be used.

In addition to the ferriferous surfaces shown in the examples below, the invention has applicability also to the treatment of surfaces comprising other metals, for example, aluminum and zinc surfaces.

Although the coating composition can be contacted with the metal surface in a variety of ways, including, for example, by spraying and flow coating, it is believed that the most widely used method of contact will comprise immersing the metal surface in the coating composition at about room temperature. It is believed that for most applications, desired coating thicknesses can be obtained by immersing the metal surface in the composition for a period of time within the range of about 30 seconds to about 5 minutes. However, it should be understood that longer or shorter periods of time can be used.

Agitating the composition aids in maintaining it uniform.

After contact with the composition, the coated metal surface can be subjected to further processing steps. Such steps are described briefly hereafter.

Water rinsing the coated surface after it has been withdrawn from the composition, and before significant drying takes place is effective in removing therefrom residuals such as acid and other ingredients of the bath that adhere to the coated surface.

If desired, the corrosion resistant properties of the coated surface can be improved by contacting the coated surface with an acidic aqueous rinse solution containing hexavalent chromium. Such rinse solutions can be prepared from chromium trioxide or a water soluble dichromate or chromate salt, for example, ammonium, sodium and potassium salts. There can also be used a chromium composition obtained by treating a concentrated aqueous solution of chromic acid with formaldehyde to reduce a portion of the hexavalent chromium. This type of rinse composition, which is described in U.S. Pat. No. 3,063,877 to Schiffman, contains chromium in its hexavalent state and reduced chromium in aqueous solution. It has been reported also that the water and salt spray resistance of a fused resinous coating can be improved by contacting the unfused coating with a solution, preferably an aqueous solution, of phosphoric acid (see U.S. Pat. No. 3,647,567). The recommended amount of phosphoric acid in the solution is about 0.25 to about 7 wt. % based on the total weight of the solution.

Following any rinse steps employed after the coated surface is withdrawn from the composition, the coating should be dried. Fusion of the resinous coating renders it continuous, thereby improving its resistance to corrosion and adherence to the underlying metal surface.

The conditions under which the drying and/or fusion operation is carried out depend somewhat upon the type of resin employed. In general, heat will be required to fuse the resin. However, there are applications where air dried coatings can be used satisfactorily. The fusion of the coating should be carried out below temperatures which cause the resinous coating to degrade. Exemplary conditions used in fusing coatings produced according to the present invention are temperatures within the range of about 100° to about 225° C. for periods of time within the range of about 10 to about 30 minutes, depending on the mass of the coated part. Baking the coating for a period of time until the metal surface has reached the temperature of the heated environment has been used effectively. Baking the coated surface can also be used to complete polymerization of unreacted monomers in the coating.

EXAMPLES

The examples below are illustrative of the present invention.

The first example illustrates the use of a coating composition in which a carboxylic acid monomer is polymerized at room temperature by free radical addition polymerization utilizing hydrogen peroxide as an initiator.

EXAMPLE 1

The following coating composition was prepared:

| Ingredients | Amounts |
| --- | --- |
| acrylic acid | 50 ml |
| HF | 2.1 g |
| $H_2O_2$ | 2 g |
| water | to make 1 liter. |

A clean steel panel was immersed in the above composition with agitation for about 5 minutes. When the panel was withdrawn from the composition, it was observed that a thick resinous film had formed thereon and that the film resisted being removed from the panel when rinsed with water. The coated panel was baked in an oven at 215° C. for 10 minutes. After baking, the texture of the resinous coating was like that of an orange peel.

The next example illustrates the use of an autodepositing composition having included therein an ethylenically unsaturated monomer capable of forming an addition polymer.

EXAMPLE 2

The following coating composition was prepared:

| Ingredients | Amounts |
| --- | --- |
| latex containing about 54% solids | 180 g |
| ferric fluoride | 3 g |
| hydrofluoric acid | 2.3 g |
| diacetone acrylamide | 10 g |
| black pigment dispersion | 5 g |
| water | to make 1 liter. |

The resin of the latex used in the above composition comprised about 62% styrene, about 30% butadiene, about 5% vinylidene chloride and about 3% methacrylic acid. A film formed from the resin is soluble in refluxing chlorobenzene to the extent of about 13%. That the resin is cross-linked is indicated by its insolubility in Soxhlet extraction with chlorobenzene. The water soluble content of the latex is about 2% based on the weight of dried resin, with the water soluble content comprising about 10% sodium phosphate, about 13% sodium oleoyl isopropanolamide sulfosuccinate and about 75% sodium dodecylbenzene sulfonate, the first mentioned ingredient being a buffering agent used in preparing the latex, and the last 2 mentioned ingredients being emulsifiers. The pH of the latex was about 7.8 and the surface tension thereof about 45–50 dynes/cm. The average particle size of the resin was about 2,000 A.

The black pigment dispersion used in the above composition is an aqueous dispersion having a total solids content of about 36%. Carbon black comprises about 30% of the dispersion. It has a pH of about 10–11.5 and a specific gravity of about 1.17. The dispersion contains a nonionic dispersing agent for the solids, and is sold under the trademark Aquablak 115.

A clean steel panel was immersed in the aforementioned coating composition at room temperature for 90 seconds, and one minute after withdrawing the panel from the composition it was rinsed with running tap water. Thereafter, the coated panel was immersed in an aqueous solution containing about 9 g/l of $Na_2Cr_2O_7 \cdot 2H_2O$ for 30 seconds and was then baked in an oven having a temperature of about 170° C. The coating had a uniformly glossy jet black appearance and a thickness of 1.3 mils.

The coated panel was subjected to salt spray testing (ASTM D-117). After 168 hours of salt spray exposure, scribe failure was 1/32" and the coated panel was awarded an 8.0 rating. After 336 hours of salt spray exposure, scribe failure was still only 1/32" and the coated panel was again awarded an 8.0 rating. These evaluations exemplify the excellent corrosion resistant properties of coatings formed from the composition of the present invention.

Other steel panels were treated in the same way, except that immediately after withdrawal from the composition, the coated panels were rinsed with running tap water. The coatings adhered well to the panels and resisted being washed off by the running tap water.

The above examples illustrate the use of specific soluble monomers to form the polymeric coating. Accordingly, it can be seen that the present invention encompasses the use of a monomer which is itself soluble in the acidic aqueous medium of the composition; thus, it is not necessary to solubilize the monomer by including in the composition an organic solvent for the monomer. It should be understood that other monomers can be used as the above are exemplary. It should be understood also, as with respect to the embodiment of Example 2, that other preformed resins can be used. Some examples of such resins include other types of styrene-butadiene polymers and acrylonitrile-butadiene, polyethylene, acrylic, tetrafluoroethylene, polyvinyl chloride and urethane resins.

I claim:

1. A process for coating a metallic surface comprising immersing the surface in an acidic aqueous coating composition containing a monomer which is capable of polymerizing by addition polymerization to form an addition polymer which has a multiplicity of groups, namely carboxyl (—COOH), phenolic (—OH) or sulfonic (—SO$_3$H) groups, which are capable of ionizing to form respectively on the polymer chain the negatively charged groups —COO$^-$, —O$^-$, or —SO$_3^-$, and wherein said monomer is soluble in the acidic aqueous medium of the composition which is free of organic solvent for the monomer, and including also an initiator selected from the group consisting of peroxides, hydroperoxides, organic azo compounds, permanganates, perborates and persulfates, and polymerizing said monomer to form said addition polymer on said surface which said surface is immersed in said composition.

2. A process for coating a metallic surface comprising immersing said surface in an acidic aqueous composition containing a monomer which is: (A) capable of polymerizing by addition polymerization to form an addition polymer; (B) soluble in the acidic aqueous medium of the composition which is free of organic solvent for the monomer; and (C) includes a group selected from the group consisting of carboxyl (—COOH), phenolic (—OH) and sulfonic (—SO$_3$H) which is capable of ionizing in the composition to form respectively a negatively charged radical selected from the group consisting of —COO$^-$, —O$^-$, and —SO$_3^-$; and forming on said surface, while immersed in said composition, from said monomer, a polymeric coating having a multiplicity of said groups capable of ionizing to form said negatively charged groups on the polymer.

3. A process according to claim 2 wherein said composition includes an initiator.

4. A process according to claim 1 or 2 wherein said monomer is an ethylenically unsaturated carboxylic acid.

5. A process according to claim 4 wherein said surface is a ferriferous surface and wherein said composition includes acrylic acid monomer, hydrogen peroxide initiator and HF, and wherein the polymerization of said monomer is initiated at room temperature.

6. A process for coating a metallic surface comprising contacting the surface with an autodepositing composition comprising an acidic aqueous coating solution having dispersed therein about 5 to about 550 g/l of pre-formed resin solids, a soluble ferric-containing compound in an amount equivalent to about 0.025 to about 3.5 g/l of ferric iron, and hydrofluoric acid and having a pH within the range of about 1.6 to about 5, and including also about 0.5 to about 50 wt.% of a monomer which is capable of polymerizing, and forming on the surface a coating including autodeposited resin formed from said pre-formed resin solids and also resin formed from said monomer.

7. A process according to claim 6 wherein said monomer is capable of forming an addition polymer.

8. A process according to claim 6 wherein said metallic surface is immersed in said composition and while immersed in said composition, said monomer polymerizes and deposits on said surface.

9. A process according to claim 7 wherein said monomer is diacetone acrylamide.

10. A process according to claim 6 wherein said autodepositing composition comprises resin solids, HF and FeF$_3$.

11. A process according to claim 6, 7, 8, 9 or 10 wherein said surface is a ferriferous surface.

12. A process according to claim 6 wherein said autodepositing composition has a pH of about 1.6 to about 4 and consists essentially of ferric fluoride in an amount equivalent to about 0.5 to about 3.5 g/l of ferric iron, about 0.2 to about 5 g/l of HF and about 50 to about 125 g/l of resin solids.

13. A process according to claim 12 wherein said surface is a ferriferous surface.

14. A process according to claim 12 or 13 wherein said surface is immersed in said composition.

15. A process according to claim 6 or 12 wherein said metallic surface is immersed in said composition and including polymerizing said monomer while said metallic surface is immersed in said composition.

16. A process according to claim 6 or 12 wherein said metallic surface is immersed in said composition and forming on the surface a coating including autodeposited resin, and thereafter withdrawing the surface from the composition and polymerizing said monomer.

17. A process according to claim 14 wherein said surface is a ferriferous surface.

18. A process according to claim 6 or 12 wherein said monomer is soluble in the acidic aqueous medium of the composition in the absence of an organic solvent therefor.

* * * * *